United States Patent
De Ruiter et al.

(10) Patent No.: US 6,227,383 B1
(45) Date of Patent: May 8, 2001

(54) FILTERING MATERIAL AND PROCESS FOR THE PRODUCTION THEREOF, AND ADSORPTION FILTER PRODUCED FROM SAID FILTERING MATERIAL

(75) Inventors: Ernest De Ruiter, Leverkusen; Jonas Toernblom, Erkrath, both of (DE)

(73) Assignee: MHB Filtration GmbH & Co., KG, Erkrath (DE)

( * ) Notice: Subject to any disclaimer, the term of this patent is extended or adjusted under 35 U.S.C. 154(b) by 0 days.

(21) Appl. No.: 09/180,145

(22) PCT Filed: May 2, 1997

(86) PCT No.: PCT/EP97/02243

§ 371 Date: Apr. 16, 1999

§ 102(e) Date: Apr. 16, 1999

(87) PCT Pub. No.: WO97/41941

PCT Pub. Date: Nov. 13, 1997

(30) Foreign Application Priority Data

| May 3, 1996 | (DE) | 196 17 755 |
| Nov. 2, 1996 | (DE) | 196 45 194 |
| Jan. 18, 1997 | (DE) | 197 01 658 |
| Mar. 18, 1997 | (DE) | 197 11 230 |
| Nov. 2, 1997 | (DE) | 196 45 195 |

(51) Int. Cl.$^7$ .................................................. B01D 39/00
(52) U.S. Cl. ............... 210/504; 210/506; 210/502.1; 442/150; 428/143; 428/402; 55/521; 55/524
(58) Field of Search .................... 210/506, 504, 210/502.1; 55/521, 524, DIG. 43, DIG. 44; 442/150; 428/143, 323, 375, 402

(56) References Cited

U.S. PATENT DOCUMENTS

| 3,998,988 | * | 12/1976 | Shimomai | 428/400 |
| 4,687,697 | * | 8/1987 | Cambo et al. | 210/504 X |
| 4,966,809 | * | 10/1990 | Tanaka et al. | 428/323 |
| 4,983,192 | * | 1/1991 | von Blücher et al. | 55/387 |
| 5,503,745 | * | 4/1996 | Ogata et al. | 210/504 X |

FOREIGN PATENT DOCUMENTS 0 262 230 * 4/1988 (EP).

OTHER PUBLICATIONS

Derwent XP002037456 of J.P. Pat. Abstract 52 114 484 A, Sep. 1977.*

* cited by examiner

*Primary Examiner*—Daniel Zirker
(74) *Attorney, Agent, or Firm*—Evenson, McKeown, Edwards & Lenahan, P.L.L.C.

(57) ABSTRACT

A filtering material with adsorbing properties which comprises a flat carrier, the carrier being provided on one or both sides with a binder coating which becomes tacky when heated and to which an adsorption material is adhered. An adsorption filter can be produced from at least two layers of the filtering material. The invention also relates to a process for producing the filtering material.

50 Claims, 6 Drawing Sheets

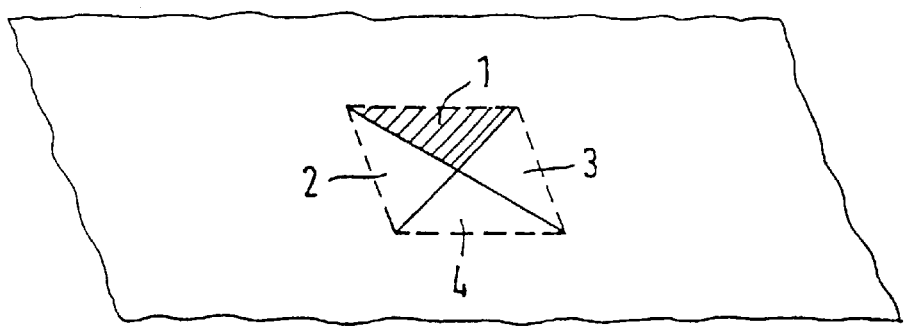
FIG.5A
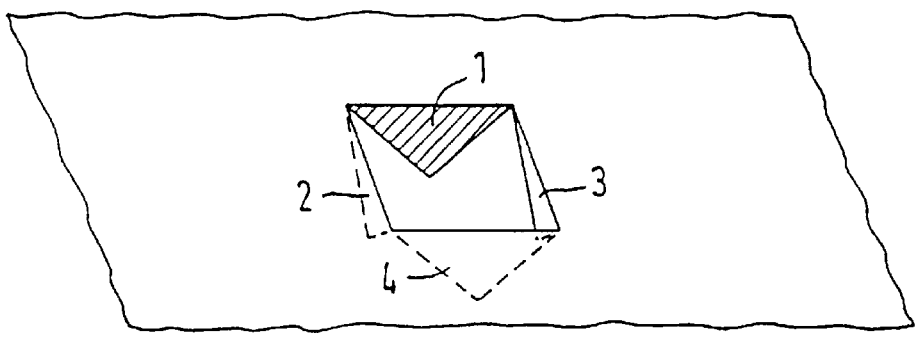
FIG.5B
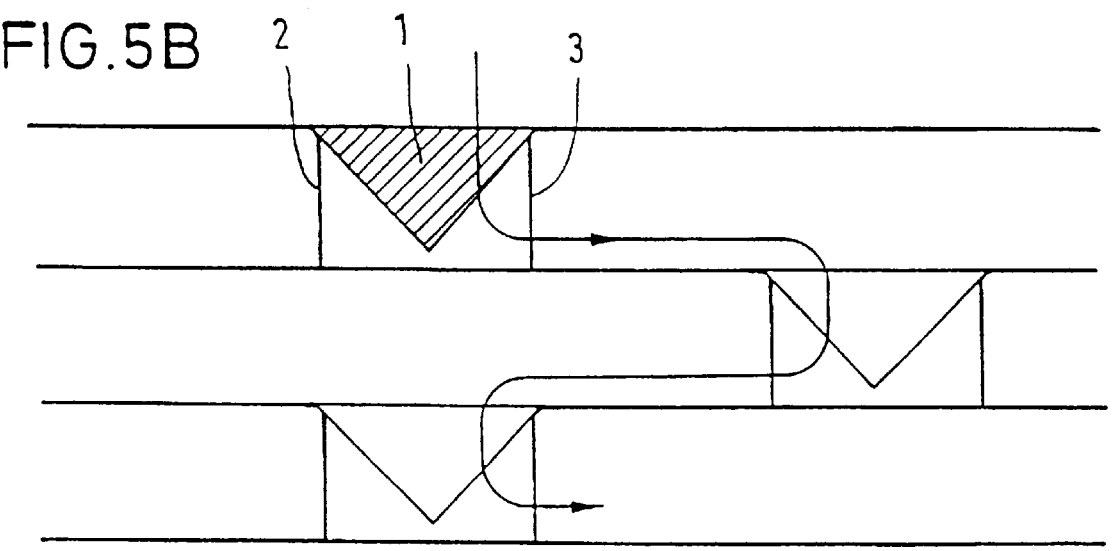

FILTERING MATERIAL AND PROCESS FOR THE PRODUCTION THEREOF, AND ADSORPTION FILTER PRODUCED FROM SAID FILTERING MATERIAL

BACKGROUND OF THE INVENTION

The present invention relates to filter materials with adsorptive properties and to a method for their manufacture. Likewise, the present invention has as its subject matter adsorption filters which consist of at least two layers of these filter materials.

In the state of the art a variety of filter materials are known. For example, bulk filters are known, in which the filter material consists of a loose bulk of adsorption materials which necessarily must be held together by a housing or container. These classical bulk filters have a series of to some extent serious disadvantages. This is because there are limitations on the selection of the particle size in that if the adsorbent particles are of too small a diameter they offer too high a resistance to flow, and on the other hand too large a particle diameter results in poor adsorption kinetics. Since the adsorption material is present in the form of loose bulk material, breakthroughs regularly occur. Also, as a result of vibration or shaking in the use of such bulk filters, adsorption material can be lost through abrasion.

Attempts are made to get around these disadvantages of conventional bulk filters by making so-called sheet filters which consist of an air-permeable support material to which first a glue must be applied, discontinuously and generally in the form of dots or lines, onto which the adsorbent particles are then affixed. The air-permeable support material can be woven or knit goods, or also an open-pore, reticulated polyurethane foam. The disadvantage of these sheet filters lies in their generally expensive manufacture and in their not always sufficient stability of shape. Also, in their manufacture and in their subsequent use, a bad odor is produced time and again especially due to degradation products or solvent components of the glues used.

SUMMARY OF THE INVENTION

The problem to which the present invention is addressed is to offer an easily available filter material with adsorptive properties, which is especially stable in shape, but nevertheless easy to emboss and/or to fold, and avoids the disadvantages of the filter materials of the state of the art.

The subject of the present invention is likewise the offering of a method for the production of such filter material, one which especially succeeds without the use of conventional adhesives.

Another problem for the present invention is seen in the development of adsorption filters which contain at least two layers of these filter materials.

The purpose of the invention is achieved by a filter material with adsorptive properties, which comprises a support in sheet form, which is covered on one or both sides with a binder layer that becomes tacky when heated, and on which an adsorption material is affixed. In particular, the adsorption material is made to adhere thermally, i.e., with the heating of the binder layer.

The support material in sheet form can be a metal foil, especially an aluminum or copper foil, the thickness of the metal foil being able to vary according to its application. The thickness of the sheet should be, however, at least $5 \mu m$, and should amount preferably to at least $10 \mu m$, especially at least $40 \mu m$. A preferred support material is an aluminum foil coated with a polyolefin, such as is used, for example, in the packaging industry, although under certain circumstances a polyester film on its back and intended as reinforcement is not objectionable insofar as excessively high temperatures do not occur.

The support material in sheet form, however, can also be paper or cardboard. The paper or cardboard in this case has generally a thickness of 0.1 to 2 mm, preferably 0.2 to 1 mm. This corresponds to a surface weight of paper or cardboard of at least about 40 $gm^2$. In particular, a stiff, embossable paper coated with plastic on one or both sides is used, the plastic becoming tacky upon heat treatment and serving as a binder composition for adhering the adsorptive material.

A certain minimum thickness of the support material is necessary in order to assure a certain minimum stability of the support material. On the other hand, a certain thickness should not be exceeded so that the material will be workable, and especially, embossable.

The binder layer that becomes tacky when heated is preferably a polyolefin coating, especially a polyethylene or polypropylene coating.

The binder layer that becomes tacky when heated generally has a layer thickness of at least 0.005 mm, preferably of at least 0.01 mm, and especially 0.02 mm.

A binder layer thickness of at least 0.005 mm is necessary in order to assure durable adhesion of the adsorption material even under stress, shaking or vibration. That is to say, the binder layer should not be thinner than 0.005 mm in order to achieve good adhesion, especially when using adsorbent granules with diameters of more than 0.2 mm.

The binder layer is applied to the support in the amount of at least 5 $g/m^2$, preferably at least 10 $g/mm^2$.

Adsorption materials suitable according to the invention are preferably selected from the group of active carbon, porous polymers, molecular sieves, ion exchangers and sustained release polymers (=polymers which are charged or filled with an active substance of a great variety of kinds and release it slowly).

For example, the adsorption material can consist of granular or pelleted adsorbent particles, which have preferably grain sizes of 0.1 to 2.0 mm, especially grain sizes of 0.2 to 1 mm, whereby the pressure loss can be controlled by the size and amount of the adsorbent grains and their quantity. The particles used in the invention generally have an internal surface area (BET) of at least 500 $m^2/g$, preferably of at least 900 $m^2/g$.

Adsorber particles suitable for use in the invention are particularly abrasion resistant.

The preferred adsorbent is active carbon. According to a special embodiment of the present invention, it can be spherical active carbon particles or granular carbon. In the selection of the active carbon, attrition-resistant types are recommendable, because otherwise dust would be formed when the excess adsorbent particles are vacuumed up and returned to the spreading apparatus, which would "dust," so to speak, the hot and sticky adherent coating, which could lead to poorer adhesion of the active carbon.

Also, inorganic adsorbents, such as zeolites or special formulations, for example, can be used for the adsorption of $H_2S$, $NH_3$ or carbon monoxide. Likewise, "porous polymers, "such as those offered under the name of "Sorbathene," are suitable for the invention. In particular, the "porous polymers" may be spherical adsorbents.

Also polymer spheres carbonized at low temperature and activated, especially sulfonated, carbonized and activated polymer spheres, are suitable according to the invention as adsorbent particles.

Finally, ion exchangers, sustained-release polymers (i.e., polymers which are charged or filled with an active substance of a wide variety of kinds and release them slowly), but also silica gel beads, can be used, and a regenerative drying can be performed in connection with an electrically heated metal foil as support, for example.

If granular or spherical adsorbent particles are used as adsorption material, the filter materials according to the invention can be prepared by the following method:

a) First a support coated on one or both sides with a binder layer that becomes tacky when heated is passed through a bed of the hot adsorbents to be applied to the support, so that the adsorbents are brought in contact with the coating and are fixed thereon.

b) Optionally, the adsorbents are pressed on.

c) Then the excess adsorption particles are removed, for example by shaking or vibration or by aspiration.

d) Before or after the excess adsorbent particles are removed in step c), the material produced in this manner is allowed to cool.

If the adsorption material consists of granular or spherical adsorbent particles and is to be applied to only one side, the filter materials of the invention alternatively can be manufactured by the following method:

a) A support material coated on one side with a binder layer that becomes tacky when heated is heated until the binder layer becomes tacky, the heating preferably being applied from the support material side, i.e., from the side opposite the coating.

b) The heated, tacky binder layer is then brought into contact with the adsorbents, for example by spreading, optionally with pressing.

c) Then the excess adsorbent particles are removed, for example by shaking movements/vibration or aspiration.

d) Finally, the support material prepared in this manner is cooled, this step being performed either before or after the removal of the excess adsorbent particles in step c).

BRIEF DESCRIPTION OF THE DRAWINGS

FIGS. 5A and 5B depict a filter formed from layers of material provided with crossed slits in laterally spaced locations.

DETAILED DESCRIPTION OF PREFERRED EMBODIMENTS

Figure 1:
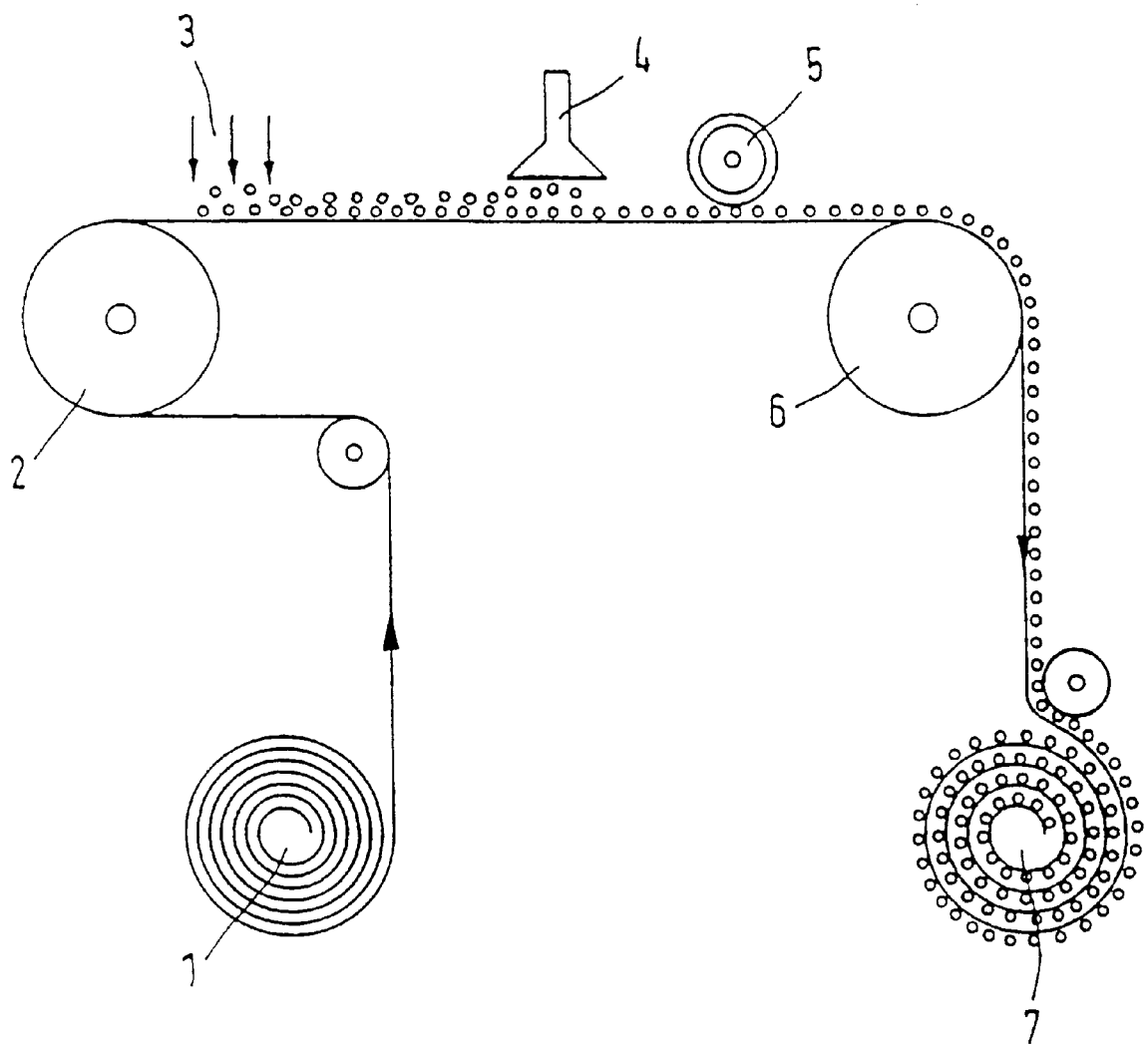
FIG. 1 is a schematic representation of an apparatus and process for producing a filter material according to the invention.

The accompanying FIG. 1 shows schematically a manufacturing process of this kind, according to the alternative method of the invention, on the example of a polyolefin-coated metal foil. One starts out with a metal foil 1 coated on one side with polyolefin, preferably an aluminum foil such as is used today for many applications, and is obtainable in a great variety of thicknesses. This foil is heated on the aluminum side to about 200° to 250° C. and then sprinkled with granular adsorbents. The heating is carried out by passing the polyolefin-coated foil over a heated drum 2 and immediately thereafter covering it with the adsorbents through a spreader 3; the excess being removed by vacuuming with an aspirator 4 or by simple shaking. To assure rapid heating the length in contact with the drum should cover more than 90°, preferably 180° or more. Optionally, the adsorption material may be pressed down with a pressure roll 5 for better adhesion. Subsequently, the product obtained in this manner is passed over a cooling drum 6 in order to cool it, and finally wound in a winder 7 to form rolls. Alternatively it is possible to stack up layers of the film thus obtained in packets.

In another embodiment of the present invention the adsorption material can be an active carbon sheet material, such as a carbonized and active nonwoven, woven or knit material. Especially suitable is an active carbon sheet material with a specific weight of 20 to 150 $g/m^2$, preferably 30 to 80 $g/m^2$, and with an internal surface area of 500 to 1500 $m^2/g$, preferably from 800 to 1300 $m^2/g$.

However, also considered as sheet materials of active carbon are active carbon laminated materials, as well as reticulated polyurethane foams charged with active carbon, in which the adsorbent particles composed of active carbon are affixed to the reticulated structure of the foam.

The active carbon sheet material can in this case be adhered to the support sheet material coated with the binder layer that becomes tacky upon heating by applying the active carbon sheet material to at least one side of the support material which is coated at least on one side with a substance that becomes tacky when heated, and then heating the entire material until the substance becomes tacky and bonding them together under pressure, the procedure of heating and pressing being performed preferably simultaneously, for example in a calender.

In general, the active carbon sheet material can be fed in and pressed against the tacky, partially melted polyolefin coating. Duplexing machines can also be used.

An interesting product can be manufactured from films coated with a polyolefin, especially from metal foils, which is outstandingly suitable for the production of high-quality adsorption filters. For example, by alternating, smooth and corrugated (embossed) layers of the laminated material, adsorption filter blocks can be made up of the type:

active carbon layer/binder layer/support foil/binder layer/ active carbon layer, with very regular channels for carrying a fluid parallel to the direction of flow. The good kinetics of the finely fibrous active carbon layer together with heavy cross diffusion (Brownian movement) provides for optimum adsorption, so that such filter blocks are especially suited to the removal of pollutants in very low concentration from flowing air.

It should be further mentioned that wherever good adsorption kinetics but only a low capacity are necessary, adsorbents in powder form can also be used.

The filter material of the invention can be embossed, especially in the form of corrugations or pleats. The corrugations or pleats have a favorable influence both on stability and on the adsorptive properties and pressure drop.

The filter material of the invention in generally in strip form, and the embossing can be perpendicular or at an angle to the edge of this strip. In particular, the angle between the embossing and the edge of the strip filter material can assume values between 10° and 170°, preferably between 20 and 150°. The smaller the angle between the embossed corrugations and the edge, the lower will be the pressure drop, but the turbulence that is necessary for the adsorption kinetics also will be lower. The adsorption performance, however, depends on many other factors, such as the amount, nature and size of the adsorbents, the cross section and length of the channels, the residence time, velocity of flow, etc., so that a person skilled in the art will experimentally determine the most appropriate construction of the adsorption filter, because theoretical computations are generally difficult and, under some circumstances, not even possible. In addition to embossing in corrugated or pleated form, embossing in the form of knobs or cones (pyramidal patterns) can also be employed, in which case the grains adhere to the valleys, flanks and peaks of the bosses. If granular or spherical adsorbents are involved, the support will first be embossed (with toothed wheels for example), then heated and spread with adsorbents or drawn through a bed containing hot adsorbents. If the filter is a flat fabric sheet material of active carbon (active carbon sheet material), the active carbon is usually bonded to the support on a duplexing machine, in which case the support must be flat. Embossing therefore can be performed only on the finished material. It must be performed so as to avoid damage to the active carbon nonwoven, woven or knit fabric. Therefore corrugation will be preferred over pleating.

A simple method of embossing the support material consists in introducing weak areas in the strips or webs transversely to the longitudinal direction of the support material at certain intervals (i.e., with the spacing of the desired folds), which have the purpose of enabling the material to be folded very easily or pushed together into pleats at those places.

Figure 1A:
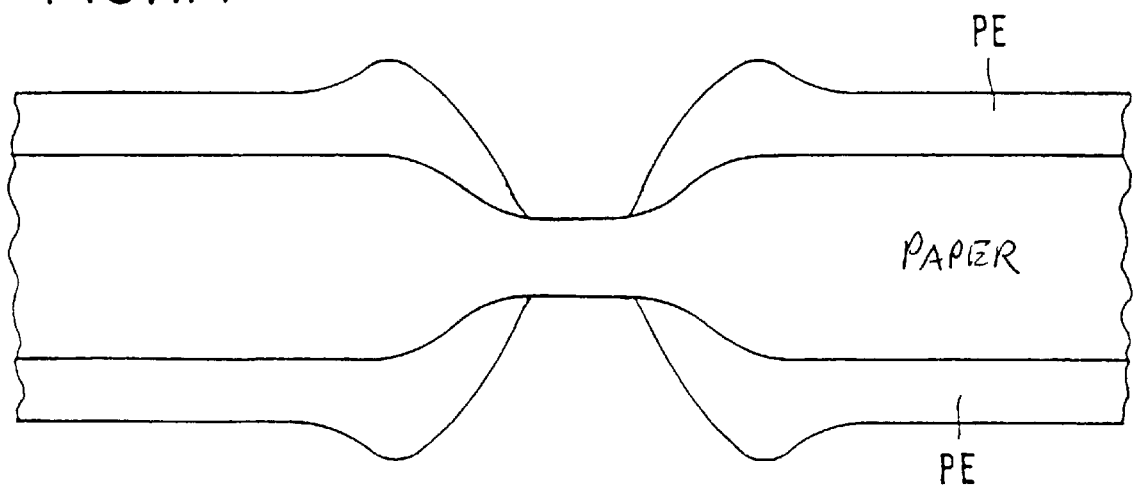
FIGS. 1A, 1B, 1C and 1D are representations of techniques for forming fold locations in a filter material according to the invention.
Figure 1B:
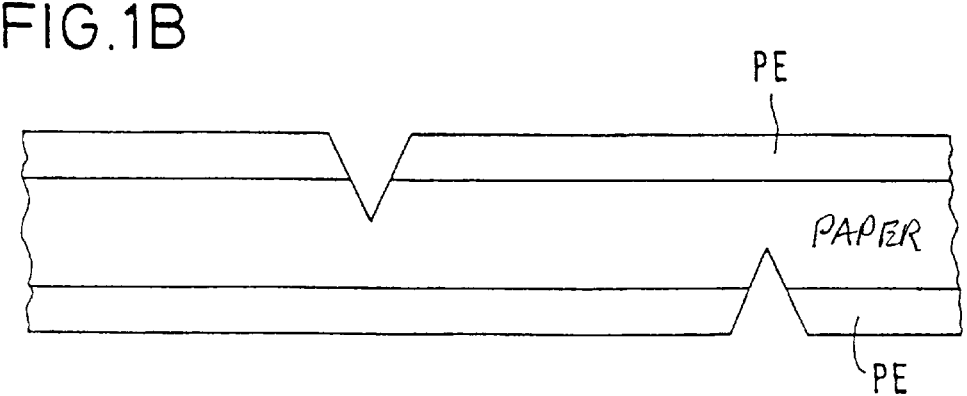
Figure 1C:
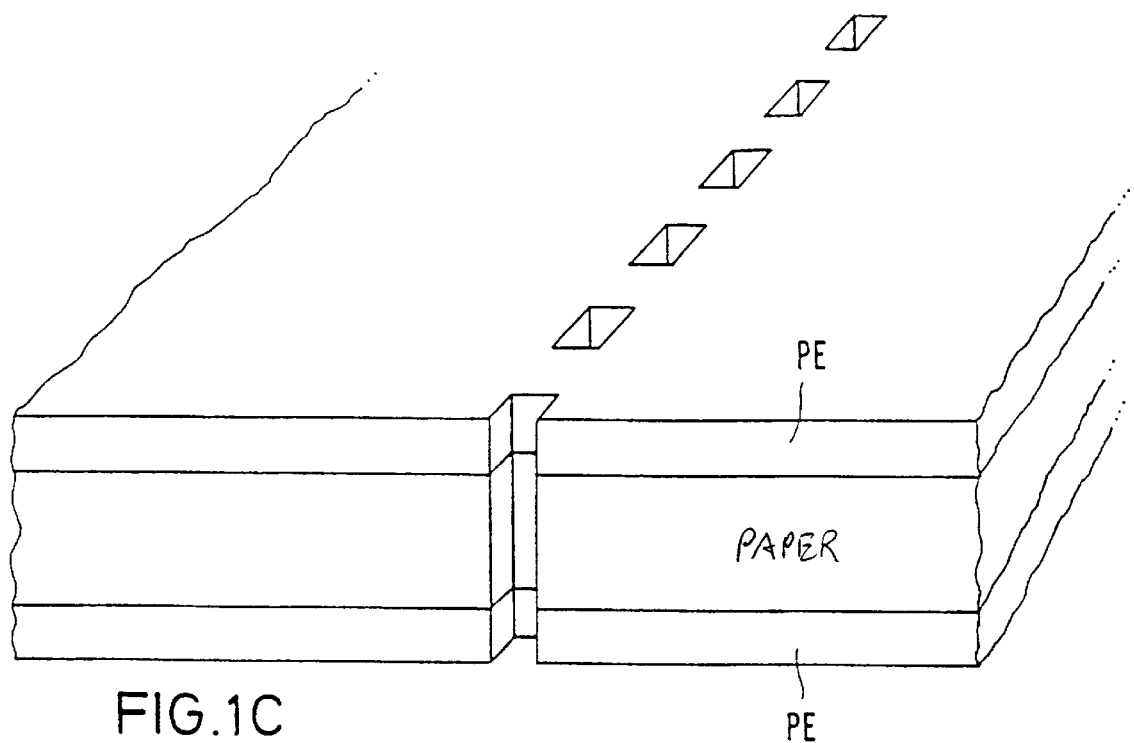
Figure 1D:
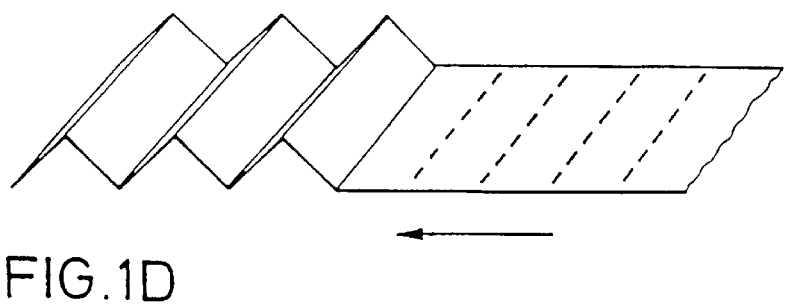

There are many possibilities for the purpose, three of which are to be pointed out below, without considering them as limitations:

A first possibility is shown in FIG. 1A. With two hot knives the coating (here a layer of polyethylene PE) is forced apart and the paper or aluminum foil is pinched. Another possibility is to make cuts down to about half the thickness on alternating sides, and thus to create the weakened points needed for the pleating (FIG. 1B). Finally, a perforation, especially a linear perforation, can be performed in order to create the weak points needed for the pleating (FIG. 1C). The support material can be charged in the flat state and then pushed together to create the pleats (FIG. 1D).

In another embodiment holes are formed in the support layer. The diameter of the holes generally lies in the range from 0.1 to 3 mm, preferably from 1 to 2 mm.

By combining at least two layers of the filter material of the invention, an adsorption filter according to the present invention can be produced.

Fluid can flow through the adsorption filter of the invention parallel or perpendicular to the layers. Perpendicular flow is possible especially when the support material is perforated or provided with holes.

The individual layers of the filter material of which the adsorption filter is comprised can be embossed with corrugations or pleats, with the embossing or corrugations of two successive layers not running parallel, but forming an angle between 10° and 170°, preferably between 20° and 150°, the fluid flowing through the filter in the direction of the corrugations.

According to another embodiment of the present invention, the individual layers of the filter material of which the adsorption filter is comprised are separated by rod-like spacers arranged parallel to the direction of flow.

For example, in this case the individual layers of the filter material of which the adsorption filter is comprised can be corrugated or pleated and rod-like spacers can be disposed between the layers parallel to the direction of flow, being preferably disposed alternately above and below a layer, so that the layers assume a corrugated shape and channels are formed between the layers, parallel to the direction of flow.

According to another embodiment of the present invention, the adsorption filter is composed of several layers of the filter material of the invention, the layers being pierced with crossed slits, and the triangular surfaces situated between the crossed slits are bent downward and assume the function of spacers, while the piercings (breakouts) are arranged in such a way that they do not lie one above the other, but are laterally offset, so that a gas flowing through a pierced area strikes a closed area of the next layer covered with adsorbent and is diverted laterally. A fluid will flow through such an adsorption filter pack according to the present invention, generally perpendicularly to the layers.

According to still another embodiment of the present invention, only every second layer of the individual layers of which the adsorption filter is composed, is provided with corrugations or zig-zag pleats, so that channels parallel to the corrugations are formed through which fluids can flow.

By appropriately embossing, a particular superposition of particular layers, and optionally by the use of embedded spacers, a person skilled in the art is able to determine the permeability of the filter materials of the adsorption filter composed of several layers which are charged with adsorbents according to the invention.

If the support is embossed, the embossment can, according to a special embodiment of the present invention, serve as a spacer.

One interesting variant is embossing with simultaneous perforation of the support, so that fluid can flow through an adsorption filter pack made of such material both parallel and perpendicular to the support. In this case holes with diameters up to 1 mm are preferred.

Interesting applications of the adsorption filters of the invention are their use as fresh-air filters for motor vehicle passenger compartments, air conditioning apparatus, but also as rotary adsorbers for industry.

Small, crumpled strips of the filter material of the invention can be used as highly air-permeable filling for bulk filters.

In the accompanying FIGS. 2, 3, 3A, 4, 5A, and 5B additional possibilities are represented for the design of high-performance adsorption filters according to the invention, which are made by combining a plurality of layers of the filter material of the invention.

Figure 2:
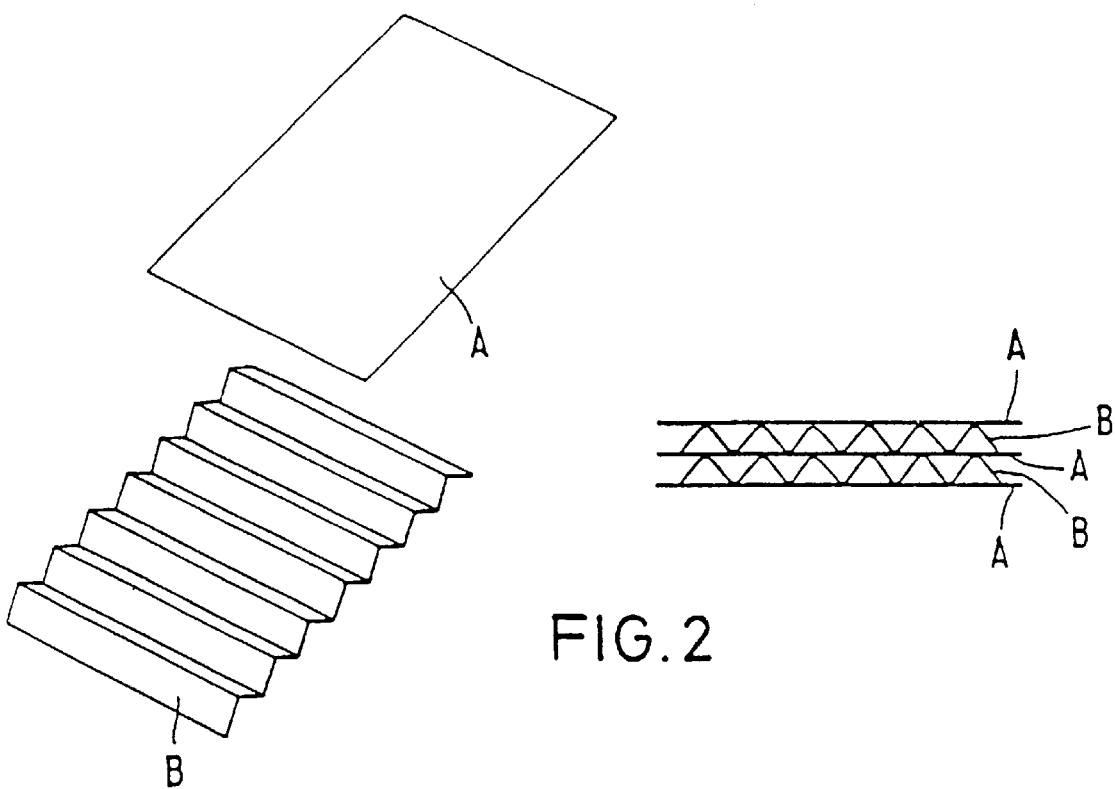
FIGS. 2, 3, 3A and 4 are representations of techniques for forming an adsorption filter from multiple layers of a filter material according to the invention.
Figure 3:
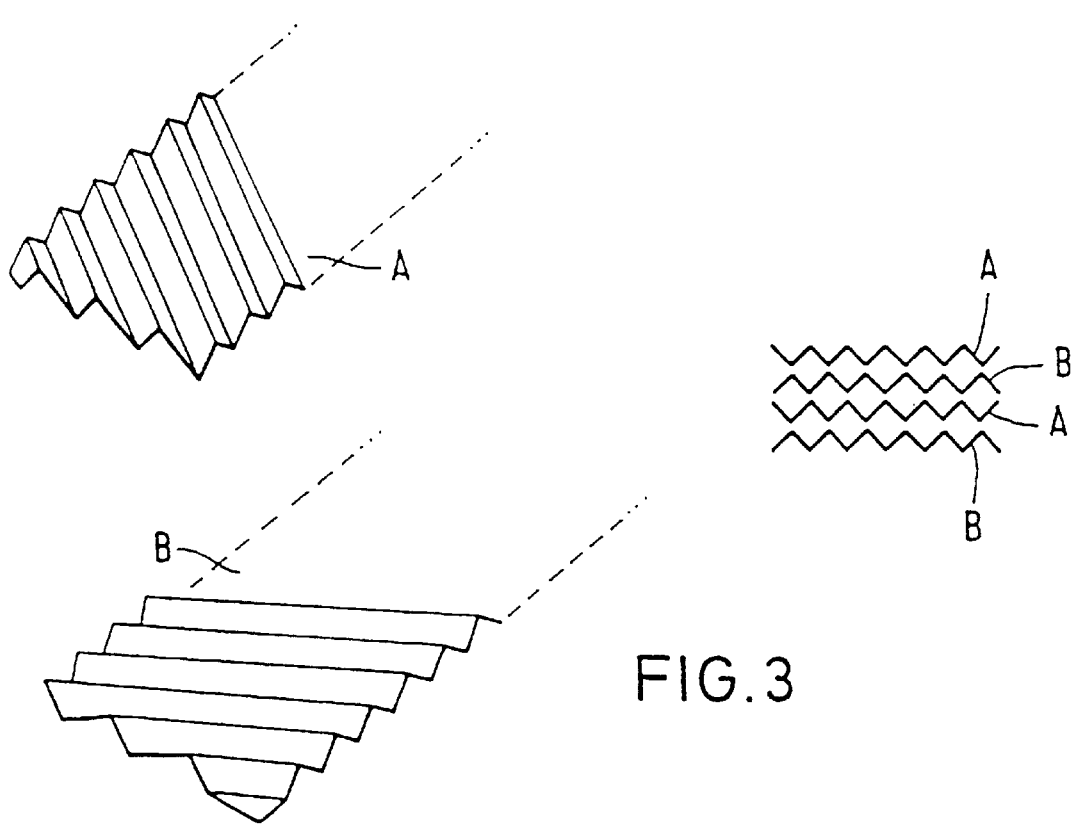

A first possibility is to have an unembossed layer following each layer provided with corrugations or pleats, so as to obtain a series of channels which can carry fluids parallel to the layers (FIG. 2). Then the adsorption filter blocks or filter wheels can be made up of the layers. To close off the filter blocks laterally there are many possibilities known to persons skilled in the art, and it is advantageous to combine the lateral sealing with the making of a frame. So-called filter wheels can best be constructed from a pair of strips having corrugations which form an angle with one another. An additional possibility is to arrange the corrugations or pleats at an angle, and in the construction of an adsorption filter block or filter wheel two successive layers form an angle (FIG. 3). Thus two different advantages are obtained: on the one hand the turbulence so important to the adsorption kinetics is greatly increased, and on the other hand the shuffling of the layers into one another is no longer possible, so that spacers and intermediate layers are not necessary.

Figure 3A:
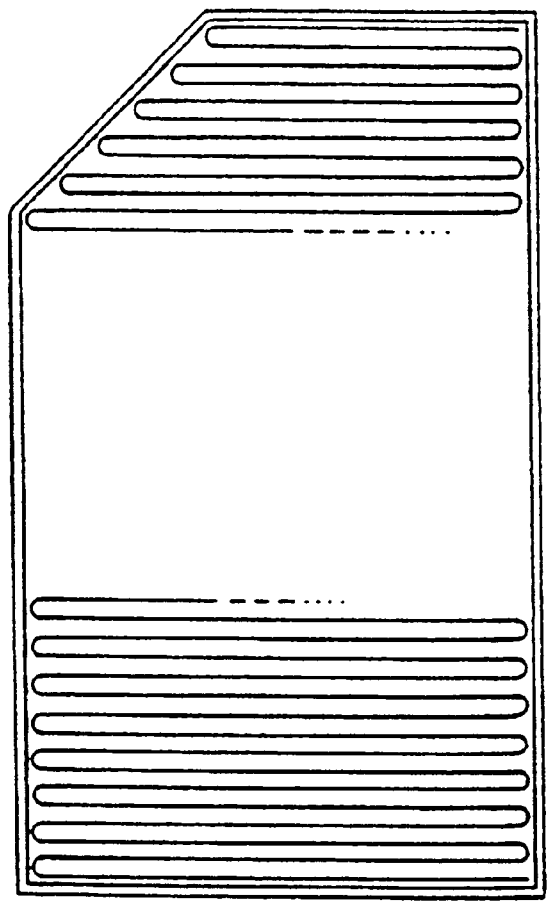

An interesting possibility for producing a filter block in any desired form is to move a band with slanting corrugations and charged with adsorbents back and forth in a filter frame or between two surfaces until the desired depth is reached. At each reversal point the direction of the corrugations changes, so that the previously described crossed corrugations are automatically obtained (FIG. 3A).

Figure 4:
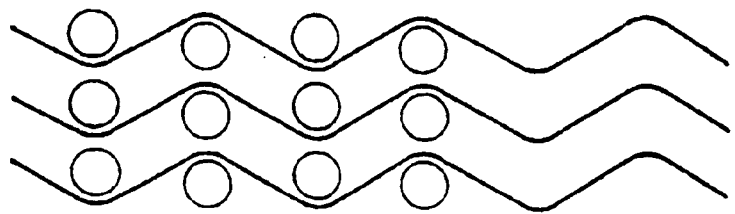

An arrangement without any embossing is shown in FIG. 4. Rod-shaped spacers are applied above and below a layer, parallel to the direction of flow, so that when the layers are compressed together, channels likewise form whose cross section is determined by the size and number of the spacers.

Finally, a fluid can flow through a filter pack, not parallel but perpendicular to the layers. For this purpose cross slits about 0.5 to 5 mm, preferably 2 to 3 mm in size are pierced into the coated or uncoated support material and the triangular areas which form between the arms of the crosses are bent downward (FIG. 5A). They then form spacers with respect to the following layer. When assembling the layers, care must be taken that the perforations are not one above another, so that the gases, after passing through a perforation, impinge against a solid adsorbent layer and must turn laterally to the next perforation (FIG. 5B). Here strong turbulence is also produced.

The filter material according to the invention has the decided advantage over sheet filters of the prior art that it is produced without the use of conventional glues. As a result of the avoidance of glues by the use of a coating that becomes tacky when heated, no bad odors due, for example, to released glue components or decomposition products, are produced during use or under load, as is often the case with sheet filters of the prior art.

Also, the filter materials of the invention have the advantage that, on the one hand, they are of relatively stable shape, but on the other hand they are still sufficiently flexible, foldable, creasable and embossable and thus can be lastingly formed into the desired shape. In addition to their ease of processing and working, the filter materials of the invention have a comparatively great chemical resistance, especially when the support is a metal foil.

The filter elements of the invention are characterized by excellent kinetics combined with low pressure drop.

Another advantage of the filter elements of the invention lies in the possibility of "internal" heating by an electric current for the desorption process. That is to say, especially when the support material is a thermally conductive metal film, the filter material can be heated for the desorption and thus for regeneration.

The filter materials of the invention can also be manufactured with relatively little expense. The manufacturing process of the invention for producing the filter material results in a product of regular structure and uniform loading, which has the same resistance to flow through the entire material. In particular, the method of the invention has the advantage that the use of a coating that becomes tacky when heated does not result in any bad odors caused by liberated glue components or degradation products during manufacture. The filter materials of the invention produced in this manner do not release odorous glue decomposition products under stress, even after their manufacture.

Additional advantages of the present invention are shown by the following examples which, however, are by no meals restrictive.

EXAMPLE 1

An aluminum foil about 12 $\mu$m thick, which was covered on one side with an approximately 25 $\mu$m thick polyethylene film, and on the other side with a polyester film, was heated according to the scheme represented in FIG. 1. Then an active carbon nonwoven fabric weighing 80 g/m$^2$ was brought to it and lightly pressed on. The result was a sheet material which was rolled up to form a "filter wheel" having a thickness of 5 cm and a diameter of 20 cm.

EXAMPLE 2

An aluminum foil 40 $\mu$m thick, which was provided on both sides with a polyethylene coating 25 $\mu$m thick, was introduced like a sandwich between two active carbon nonwoven fabrics weighing 80 g/m$^2$ into a duplexing machine made by Kannegiesser, heated at 180° C. The result was a sandwich structure, comprising two active carbon nonwovens and an aluminum foil embedded between them. The material was able to be corrugated (corrugation depth: 3 mm; space between corrugations: 6 mm). An adsorption filter block was built up from alternating layers of corrugated and non-corrugated material in the parallel channels of which fluid was able to flow.

EXAMPLE 3

An 80-gram paper which had been coated with a 20-gram polyethylene film, was heated as illustrated in the schematic drawing in FIG. 1, and sprinkled with granular adsorbents. The adsorbents were lightly pressed on and after cooling had excellent adherence to the support.

What is claimed is:

1. A filter material with adsorbent properties, comprising a support in sheet form having on at least one side thereof a binder coating that becomes tacky when heated, and a layer of adsorption material thermally adhered to said binder coating, wherein the support is embossed.

2. A filter material according to claim 1, wherein the support in sheet form is a metal foil.

3. A filter material according to claim 2, wherein the metal is selected from the group consisting of aluminum and copper.

4. A filter material according to claim 2, wherein the metal foil has a thickness of at least 5 $\mu$m.

5. A filter material according to claim 4, wherein the metal foil has a thickness of at least 10 $\mu$m.

6. A filter material according to claim 5, wherein the metal foil has a thickness of at least 40 $\mu$m.

7. A filter material according to claim 1, wherein the support has corrugated or pleated embossing.

8. A filter material according to claim 7, wherein the filter material is in strip form having an edge, and the embossing runs at an angle to the edge of the strip.

9. A filter material according to claim 8, wherein the embossing runs perpendicular to the edge of the strip.

10. A filter material according to claim 8, wherein the embossing forms an angle of 10°0 to 170° with the edge of the strip.

11. A filter material according to claim 10, wherein the embossing forms an angle of 20° to 15° with the edge of the strip.

12. A filter material with adsorbent properties, comprising a support in sheet form having on at least one side thereof a binder coating that becomes tacky when heated, and a layer of adsorption material thermally adhered to said binder coating, wherein the support material in sheet form is paper or cardboard.

13. A filter material according to claim 12, wherein the paper or cardboard has a thickness of 0.1 to 2 mm.

14. A filter material according to claim 13, wherein the paper or cardboard has a thickness of 0.2 to 1 mm.

15. A filter material according to claim 12, wherein the paper or cardboard has a specific weight of at least 40 g/m$^2$.

16. A filter material according to claim 12, wherein the coating that becomes tacky when heated is applied to the support in an amount of at least 5 g/m².

17. A filter material according to claim 16, wherein the coating that becomes tacky when heated is applied to the support in an amount of at least 10 g/m².

18. A filter material according to claim 12, wherein the adsorption material is selected from the group consisting of active carbon, porous polymers, molecular sieves, silica gel and ion exchangers.

19. A filter material according to claim 18, wherein the adsorption material comprises granular or spherical adsorbent particles having grain sizes in the range from 0.1 to 2.0 mm.

20. A filter material according to claim 19, wherein the adsorption material comprises particles having grain sizes in the range from 0.2 to 1 mm.

21. A filter material according to claim 19, wherein the adsorption material comprises attrition-resistant active carbon particles.

22. A filter material according to claim 18, wherein the adsorption material is a flat sheet of active carbon.

23. A filter material according to claim 22, wherein the flat sheet of active carbon has a specific weight of 20 to 150 g/m² and a surface area of 500 to 1500 m²/g.

24. A filter material according to claim 23, wherein the flat sheet of active carbon has a specific weight of 30 to 80 g/m² and a surface area of 800 to 1300 m²/g.

25. A filter material with adsorbent properties, comprising a support in sheet form having on at least one side thereof a binder coating that becomes tacky when heated, and a layer of adsorption material thermally adhered to said binder coating, wherein the support sheet is perforated.

26. A filter material according to claim 25, wherein perforations of the perforated support material have a diameter of 0.1 to 3 mm.

27. A filter material according to claim 26, wherein perforations of the perforated support material have a diameter, of 1 to 2 mm.

28. A filter material with adsorbent properties, comprising a support in sheet form having on at least one side thereof a binder coating that becomes tacky when heated, and a layer of adsorption material thermally adhered to said binder coating, wherein the binder coating that becomes tacky when heated is a polyolefin coating.

29. A filter material according to claim 28, wherein the polyolefin coating is a polyethylene or polypropylene coating.

30. A filter material according to claim 28, wherein the binder coating that becomes tacky when heated has a thickness of at least 0.005 mm.

31. A filter material according to claim 30, wherein the binder coating that becomes tacky when heated has a thickness of at least 0.01 mm.

32. A filter material according to claim 31, wherein the binder coating that becomes tacky when heated has a thickness of at least 0.02 mm.

33. A filter material with adsorbent properties, comprising a support in sheet form having on at least one side thereof a binder coating that becomes tacky when heated, and a layer of adsorption material thermally adhered to said binder coating, wherein the adsorption material is a flat sheet of active carbon having a specific weight of 20 to 150 g/m² and a surface area of 500 to 1500 m²/g, and wherein the flat sheet of active carbon is a carbonized and activated nonwoven, woven or knit fabric.

34. A method of manufacturing a filter material with adsorbent properties, said material comprising a support in sheet form having on at least one side thereof a binder coating that becomes tacky when heated, and a layer of adsorption material thermally adhered to said binder coating, said method comprising the steps of:
a) guiding a support material coated on least one side with a coating that becomes tacky when heated through a bed of hot adsorbent material to be affixed, so that the hot adsorbent material is brought into contact with the binder coating and adheres thereto;
b) optionally pressing the adsorbent material onto the binder coating;
c) removing excess adsorbent material from the coated support; and
d) cooling the coated support before or after removal of the excess adsorbent material in step c).

35. A method according to claim 34, wherein the adsorbent material comprises granular or spherical particles and said process comprises the steps of:
a) heating a support material coated with a coating that becomes tacky when heated, until the coating becomes tacky;
b) spreading particles of the adsorbent material on the tacky coating and optionally pressing the particles into the coating;
c) removing excess adsorbent particles from the coated support material; and
d) cooling the coated support material before or after removal of excess adsorbent particles in step c).

36. A method according to claim 33, wherein the coated support material is heated by applying heat from the side opposite the coating that becomes tacky.

37. A method according to claim 34, wherein an active carbon sheet material is applied to at least one side of a support material that is coated on said at least one side with a coating that becomes tacky upon heating, and then the whole article is heated until the coating becomes tacky and is bonded together under pressure.

38. A method according to claim 37, wherein the heating an pressing are effected simultaneously.

39. A method according to claim 37, wherein the active carbon sheet material is a carbonized and activated nonwoven, woven or knit fabric.

40. A method according to claim 37, wherein the active carbon sheet material has a specific weight of from 20 to 150 g/m² and an interior surface area of from 500 to 1500 m²/g.

41. A method according to claim 40, wherein the active carbon sheet material has a specific weight of from 30 to 80 g/m², and an interior surface area of from 800 to 1300 m²/g.

42. An adsorption filter comprising at least two superposed layers of a filter material with adsorbent properties, wherein each layer comprises a support in sheet form having on at least one side thereof a binder coating that becomes tacky when heated, and a layer of adsorption material thermally adhered to said binder coating.

43. An adsorption filter according to claim 42, comprising fluid channels defined between said at least two layers of filter material through which a fluid to be filtered may flow.

44. An adsorption filter according to claim 43, wherein said fluid channels extend parallel to said at least two layers.

45. An adsorption filter according to claim 43, wherein said fluid channels extend parallel to said at least two layers.

46. An adsorption filter according to claim 42, wherein the individual layers of the filter material of which the adsorption filter is comprised, are embossed with corrugations or pleats, said corrugations or pleats of adjacent layers forming an angle between 10° and 170° and carrying fluid through the filter in the direction of the corrugations.

47. An adsorption filter according to claim 46, wherein the corrugations or pleats of adjacent layers form an angle of between 20° and 150°.

48. An adsorption filter according to claim 43, wherein individual layers of the filter material of which the adsorption filter is comprised, are separated by rod-like spacers disposed parallel to the direction of fluid flow.

49. An adsorption filter according to claim 43, wherein individual layers of the filter material of which the adsorption filter is comprised, are embossed with corrugations or pleats, and rod-like spacers are disposed between the layers parallel to the direction of flow, said rod-like spacers being disposed alternately above and below each layer, so that the layers assume a corrugated shape and channels are formed between the layers for carrying fluid parallel to the direction of flow.

50. An adsorption filter according to claim 43, wherein only alternate layers of the filter material are corrugated or pleated, so that channels for carrying fluid form parallel to the corrugations.

* * * * *